United States Patent [19]
Momont

[11] Patent Number: 5,460,732
[45] Date of Patent: Oct. 24, 1995

[54] METHOD OF MONITORING PH IN CAUSTIC LIQUOR WET OXIDATION

[75] Inventor: Joseph A. Momont, Mosinee, Wis.

[73] Assignee: Zimpro Environmental, Inc., Rothschild, Wis.

[21] Appl. No.: 304,615

[22] Filed: Sep. 12, 1994

Related U.S. Application Data

[63] Continuation of Ser. No. 63,476, May 19, 1993, abandoned, which is a continuation-in-part of Ser. No. 861,739, Apr. 1, 1992, abandoned.

[51] Int. Cl.$^6$ .................................................. C02F 1/74
[52] U.S. Cl. .................................... 210/739; 210/761
[58] Field of Search .................................. 210/739, 743, 210/761, 762

[56] References Cited

U.S. PATENT DOCUMENTS 5,082,571  1/1992  Beula et al. ........................... 210/739

Primary Examiner—Ivars Cintins
Attorney, Agent, or Firm—Tipton L. Randall

[57] ABSTRACT

A process is described for monitoring pH in caustic liquor wet oxidation systems. An offgas carbon dioxide baseline value is established for the operating system where oxidized liquid effluent is at pH 7 or above. Offgas carbon dioxide content deviating by a selected proportion above the baseline vale indicates a drop in liquid effluent pH to 7 or less. Sufficient alkalinity is added to the raw wastewater to bring the effluent pH to 7 or above and prevent excessive corrosion to the materials of construction of the nickel-based or ferrous-based alloy wet oxidation system.

14 Claims, 1 Drawing Sheet

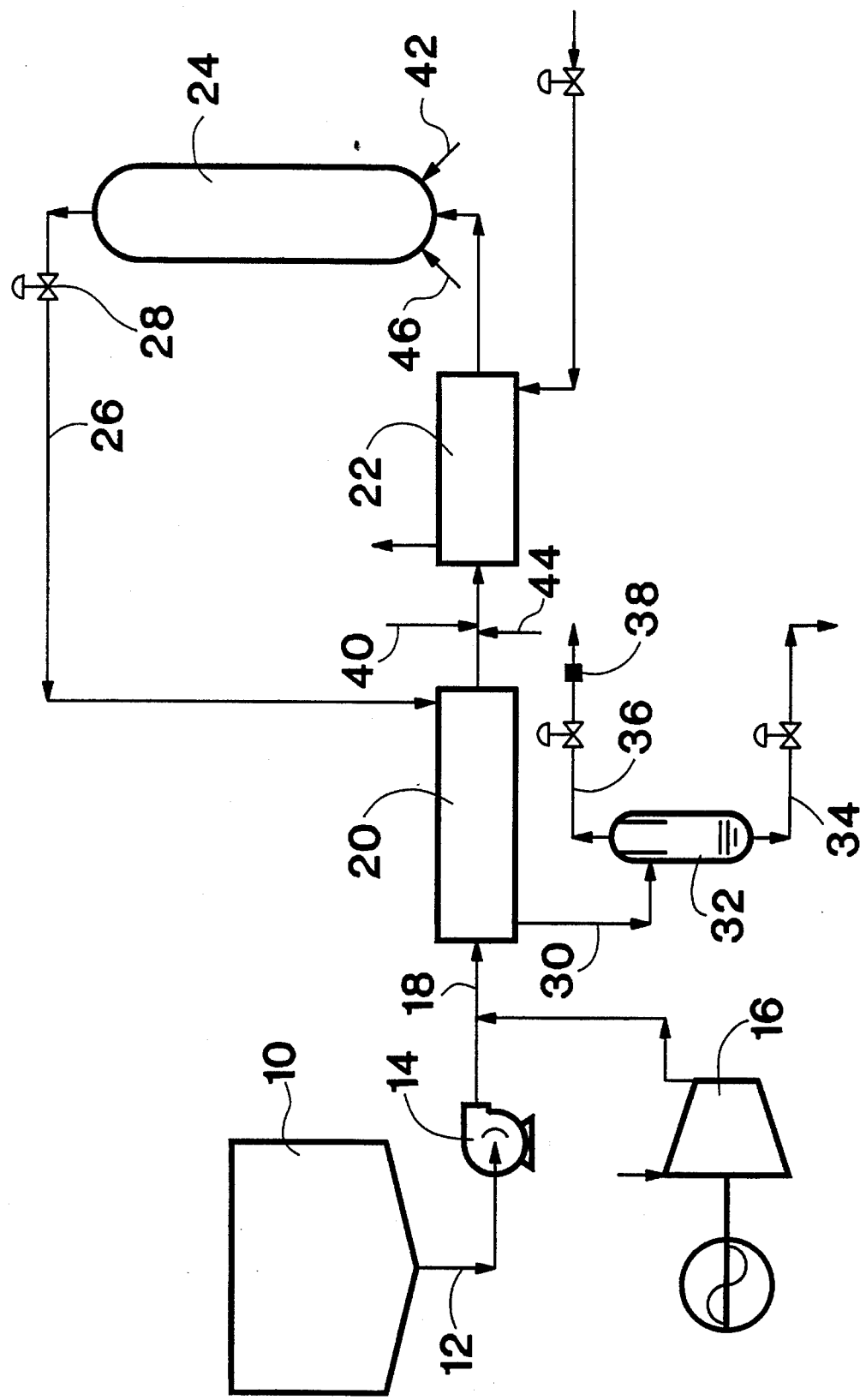
FIGURE

METHOD OF MONITORING PH IN CAUSTIC LIQUOR WET OXIDATION

This application is a continuation of application Ser. No. 08/063,476 filed May 19, 1993, which is a continuation-in-part of application Ser. No. 07/861,739, filed Apr. 1, 1992, both now abandoned.

BACKGROUND OF THE INVENTION

1. Field of the Invention

This invention relates to a method for protecting the materials of construction of a wet oxidation system treating caustic wastewaters, particularly caustic sulfide wastewaters.

2. Information Disclosure Statement

A variety of caustic wastewaters are generated which require treatment before the wastewater is released to the environment. These caustic wastewaters are generated in the petrochemical industry, petroleum refining, pulp and paper manufacture and various chemical manufacturing processes. The caustic solutions are commonly used to remove acidic components such as hydrogen sulfide, $H_2S$, mercaptans, RSH, phenols, ArOH, and organic acids, $RCO_2H$, from gas and liquid streams.

The contaminated caustic wastewaters represent a formidable disposal problem due to their caustic content as well as the acidic components therein. Neutralization of the caustic wastewaters by acid addition can result in release of the acidic components. Therefore it is essential to convert the acidic components to a form suitable for release to the environment. Further, there may be additional components present in the caustic wastewater which adds to the Chemical Oxygen Demand (COD) of the wastewater. These components include various carbonaceous materials including oils and polymers.

Wet oxidation is the preferred method of treatment for caustic wastewaters since the products of oxidation are inorganic sulfate, carbon dioxide and water. Also, the oxidation is carried out within a closed system which prevents transfer of pollutants to the atmosphere. The highly alkaline nature of these caustic wastewaters requires special materials of construction for wet oxidation systems employed in their treatment. The nickel-based alloys, such as Inconel 600, are well suited to withstand the elevated temperatures and pressures employed in the wet oxidation process for caustic wastewater treatment. The ferrous-based alloys, such as carbon steel, stainless steel or superstainless steel, may be considered for lower temperature wet oxidation treatment of caustic wastewaters. However, under wet oxidation conditions, corrosion is a serious problem for the ferrous-based alloys.

In U.S. Pat. No. 3,761,409 McCoy et al. disclose a continuous process for the air oxidation of sulfidic, ammoniacal sour water where feed water is adjusted to a pH between about 6 to 13 and the oxidation occurs at 250° F. to 520° F. at 75 to 800 psig with up to 500% excess oxygen based on the stoichiometric conversion of sulfide to sulfate.

Chowdhury in U.S. Pat. No. 4,350,599 discloses wet oxidation of caustic liquor where carbon dioxide generated by the oxidation is used to reduce the pH of the caustic feed liquor to below 11. Maintaining the feed below pH 11.0 but above 7.0 prevents corrosion of the less expensive stainless steel wet oxidation system.

As mentioned above, the nickel-based alloys are resistant to corrosion by caustic sulfide wastewaters under wet oxidation conditions, provided the pH of the wastewater is maintained on the alkaline side, that is above pH 7. Likewise, the ferrous-based alloys provide their best corrosion resistance at neutral or alkaline pH, provided the temperature of the system remains relatively low. The wet oxidation of sulfide wastewaters generates acidic species which consume alkalinity. Depending on the components present, their concentration, and the pH of the caustic sulfide wastewater, wet oxidation may produce an oxidized wastewater in which the pH is acidic, i.e. all alkalinity is consumed, and which is highly corrosive to the nickel-based or ferrous-based wet oxidation system.

Beula et al. in U.S. Pat. No. 5,082,571 have devised a process which relates the species present in the caustic liquor to the amount of caustic required to maintain an excess of alkalinity in the liquor during wet oxidation treatment. This process allows a nickel-based alloy wet oxidation system to safely treat caustic sulfide liquor without excessive corrosion to the materials of construction of the system. The process requires extensive analysis of the raw feed liquor and gives best results with a constant composition feed. Problems can result where feed composition changes and alkalinity consuming species increase, causing a drop in the pH of the oxidized wastewater.

To overcome this problem, I have devised a method of determining a drop in pH for a caustic wastewater undergoing wet oxidation treatment which allows for the adjustment of the raw feed composition, i.e. pH, before corrosion to the materials of construction of the wet oxidation system occurs. It must be recognized that the corrosion problems need careful consideration in that the integrity of the pressurized wet oxidation system is important for both safety and economic reasons.

SUMMARY OF THE INVENTION

The invention comprises a process for preventing corrosion to the materials of construction of a nickel-base alloy or ferrous-based alloy wet oxidation system treating raw caustic wastewaters at elevated temperature and pressure comprising the steps;

(a) establishing a flow of caustic wastewater and oxygen containing gas through said wet oxidation system to produce an oxidized gas/liquid mixture;

(b) separating said oxidized gas/liquid mixture into an oxidized liquid phase effluent and a gaseous phase effluent;

(c) measuring the carbon dioxide content of said gaseous phase effluent to establish a baseline carbon dioxide content value while the pH of said system liquid effluent remains at 7 or above; and (d) adding sufficient alkalinity to said raw caustic wastewater to maintain said system liquid effluent pH at 7 or above, upon the carbon dioxide content of said gaseous phase effluent exceeding said baseline value by a selected proportion, thereby preventing excessive corrosion to the material of construction of said wet oxidation system.

In an alternative embodiment of the invention, a flow of clean water and oxygen containing gas is established through the system and caustic wastewater is injected into the system at the reactor or any point upstream thereof.

BRIEF DESCRIPTION OF THE DRAWING

The FIGURE shows a general schematic diagram for a wet oxidation system used to treat caustic wastewaters.

DESCRIPTION OF THE PREFERRED EMBODIMENTS

The invention is applicable to all caustic wastewaters treated by wet oxidation. It is particularly applicable to caustic sulfide scrubbing liquor and the invention will be described as applied to such a wastewater.

The FIGURE shows a schematic flow diagram for a wet oxidation system used for treatment of caustic sulfide scrubbing liquors. Referring to the FIGURE, raw caustic sulfide liquor from a storage tank 10 flows through a conduit 12 to a high pressure pump 14 which pressurizes the liquor. The raw liquor is mixed with a pressurized oxygen-containing gas, such as air, supplied by a compressor 16, within a conduit 18. The mixture flows through a heat exchanger 20 where it is heated to a temperature which initiates oxidation. The heated mixture then flows through a second heat exchanger 22 which provides auxiliary heat for startup of the system. For waste with low COD content, auxiliary heating may need to be continuously applied through the second heat exchanger 22 in order to maintain the desired operating temperature for the wet oxidation system. The heated feed mixture then enters a reactor vessel 24 which provides a residence time wherein the bulk of the oxidation reaction occurs. The oxidized liquor and oxygen depleted gas mixture then exits the reactor through a conduit 26 controlled by a pressure control valve 28. The hot oxidized effluent traverses the heat exchanger 20 where it is cooled against incoming raw liquor and gas mixture. The cooled effluent mixture flows through a conduit 30 to a separator vessel 32 where liquid and gases are disengaged. The liquid effluent exits the separator vessel 32 through a lower conduit 34 while the gases are vented through an upper conduit 36. The carbon dioxide content of the gases are continuously measured by a carbon dioxide monitor 38, located within the upper conduit 36. The carbon dioxide monitor 38 may be any of the commercially available instruments well known in the industry.

It is imperative that an excess of alkalinity be maintained throughout the nickel-based alloy or ferrous-based alloy wet oxidation system when treating caustic sulfide liquor. The excess alkalinity maintains the liquid phase at pH 7 or above and prevents corrosion of the nickel-based alloy or ferrous-based alloy system.

The raw caustic wastewater may contain carbonate or bicarbonate salts depending upon the pH of the liquid. Additionally, carbon dioxide is generated by oxidation of carbonaceous compounds in the waste liquor. The carbon dioxide generated may be absorbed by the caustic solution within the system as carbonate/bicarbonate also.

It is well known that as a carbonate solution is made acidic, carbon dioxide gas is generated. Acid addition to a carbonate solution protonates the carbonate ion, giving carbonic acid which decomposes to water and carbon dioxide which is liberated from solution. The proportion of carbonate, bicarbonate and carbonic acid present in a liquid as a function of pH can be readily calculated. Here the total carbonate concentration is denoted as $C_{carb}$. The dissociation constants for carbonic acid ($H_2CO_3$) are:

$K_1 = 4.3 \times 10^{-7}$ and $K_2 = 5.6 \times 10^{-11}$ and $\{H^+\} = 10^{-pH}$ According to acid-base equilibrium principles, it follows that:

$\{H_2CO_3\} = C_{carb}[\{H^+\}^2/\{H^+\}^2 + K_1\{H^+\} + K_1 K_2]$ $\{HCO_3^-\} = C_{carb}[K_1\{H^+\}/\{H^+\}^2 + K_1\{H^+\} + K_1 K_2]$ $\{CO_3^=\} = C_{carb}[K_1 K_2 /\{H^+\}^2 + K_1\{H^+\} + K_1 K_2]$ Using the first two equations, the ratio of concentration of carbonic acid to bicarbonate can be calculated over the pH range 5 to 10. This ratio, from the first two above equations, simplifies to $\{H_2CO_3\}/\{HCO_3^-\} = \{H^+\}^2/\{H^+\}K_1 = \{H^+\}/K_1$ which gives the following:

TABLE 1

| pH | $\{H^+\}$ | $\{H_2CO_3\}/\{HCO_3^-\}$ |
|---|---|---|
| 5 | $1 \times 10^{-4}$ | 23.25 |
| 6 | $1 \times 10^{-4}$ | 2.325 |
| 7 | $1 \times 10^{-4}$ | 0.2325 |
| 8 | $1 \times 10^{-4}$ | 0.02325 |
| 9 | $1 \times 10^{-4}$ | 0.002325 |
| 10 | $1 \times 10^{-10}$ | 0.0002325 |

Thus at pH 7, the ratio of $\{H_2CO_3\}/\{HCO_3^-\}$ is about 0.25 (1:4) or 20% $H_2CO_3$ present. At pH 8 the ratio is only 0.023 (1:50) or 2% $H_2CO_3$ present. Should the pH of the liquid within the wet oxidation system drop to 7 or lower, the carbonic acid formed decomposes to carbon dioxide and water, with the carbon dioxide entering the gas phase. Further, the residence time of the gas phase within the wet oxidation system is much less than that of the liquid phase. Wet oxidation systems for caustic wastewaters are designed for a reactor vessel residence time of about 30 minutes to 120 minutes. Depending upon the strength of the waste, the gas phase residence time in the reactor vessel is about 5 minutes or less. Thus, any carbon dioxide driven into the gas phase is quickly carried through the system to the separator vessel 32 where it reports in the gas phase and is detected by the carbon dioxide monitor 38 in the upper gas conduit 36.

In implementing the invention, a flow of caustic wastewater and oxygen containing gas is established through the wet oxidation system at selected elevated temperature and pressure. For systems made of nickel-based alloy, the operating temperature may be as low as 105° C. (221° F.) or as high as 300° C. (572° F.). Operating pressure may vary from about 45 psig (310 kPa) up to 4,000 psig (27,578 kPa) depending on the oxygen containing gas used in the system. For systems made of ferrous-based alloy, the operating temperature may be as low as 105° C. (221° F.) or as high as 175° C. (347° F.) with operating pressure from about 45 psig (310 kPa) up to 1,000 psig (6,895 kPa). The oxidized gas liquid mixture is separated into an oxidized liquid phase effluent and a gaseous phase effluent. The carbon dioxide content of the gaseous phase effluent is monitored to establish a baseline carbon dioxide content value while the pH of said system liquid effluent remains at 7 or above. There is generally little carbon dioxide in the gaseous phase when the oxidized liquid phase is caustic. There may be certain wastes which do produce a nonzero carbon dioxide offgas contest, so a baseline carbon dioxide level in the offgases is established.

Should the carbon dioxide content of the offgases exceed the baseline value by a selected proportion, an alarm means is activated to warn that additional alkalinity must be added to the raw caustic wastewater to maintain the system liquid effluent pH at 7 or above, thereby preventing excessive corrosion to the material of construction of the nickel-based alloy or ferrous-based metal wet oxidation system.

In an alternative embodiment, a flow of clean water is first established through the wet oxidation system by filling the storage tank 10 with clean water and using the feed pump 14 to pump the clean water through the system. An oxygen-containing gas, supplied by the compressor 16, is mixed with the clean water within the conduit 18. The temperature and pressure within the system are elevated by the auxiliary heat exchanger 22. Concentrated wastewater then is added to the system by means of a second feed pump (not shown) at any point as far downstream as the reactor vessel 24. Alternative points of addition for the wastewater are shown as 40 and 42. In this embodiment the flow of clean water from the water pump 14 is required to dilute the concentrated wastewater within the system and provide sufficient liquid water for evaporative cooling and heat removal from the reactor vessel 24. The flow of clean water is also required to traverse the process heat exchanger 20 and recover the heat from the hot oxidized effluent leaving the system where the point of waste injection is beyond the process heat exchanger 20.

Oxygen-containing gas addition points may be varied as well, depending on the characteristics of the particular wastewater treated by the system and the point of addition of the wastewater. These alternative points are denoted as 44 and 46. A wastewater which fouls heat exchangers when heated with limited oxygen would dictate that the oxygen containing gas be added upstream of the wastewater point of addition. Other wastewaters become extremely corrosive when heated in the absence of dissolved oxygen, thus dictating the addition of oxygen containing gas to the wastewater upstream of any heating device. Certain wastes which are difficult to dissolve, slurry or suspend in water can be injected directly into the reactor vessel. In this situation the oxygen containing gas may be added directly to the reactor vessel 24 or at any point upstream of the reactor vessel.

EXAMPLE

A sample of spent caustic scrubbing liquor was obtained from a petrochemical plant. The liquor contained about 22 g/l of COD, mainly a mixture of sodium sulfide, $Na_2S$, and sodium hydrogen sulfide, $NaHS$. The liquor had a pH of 13.63 and contained about 15 g/l of sodium hydroxide, $NaOH$, and about 3.2 g/l of sodium carbonate, $Na_2CO_3$. The sulfides present will consume alkalinity on wet oxidation and lower the pH of the oxidized effluent. If sufficient alkalinity is not available, the pH will become acidic and damage the materials of construction of the wet oxidation system.

Samples of the caustic wastewater were partially neutralized with sulfuric acid to reduce the alkalinity available in each. The samples were each placed in an autoclave, pressurized with sufficient air to oxidize all COD contained, and heated at 160° C. (194° F.) for five minutes. After cooling, the carbon dioxide and oxygen content of the offgases were measured by gas chromatography. The pH of the oxidized liquid phase was also determined. The results of these analyses are shown in Table 2.

TABLE 2

| Run No. | 1 | 2 | 3 | 4 |
| --- | --- | --- | --- | --- |
| pH of Feed | 13.63 | 13.35 | 13.30 | 13.21 |
| pH of Oxidized | 12.36 | 8.62 | 7.95 | 2.63 |
| Offgas $CO_2$, % | 0.00 | 0.00 | 0.26 | 0.44 |
| Offgas $O_2$, % | 11.40 | 12.62 | 11.30 | 11.05 |

In runs No. 3 and 4, the pH of the oxidized liquor phase drops to below about pH 8.0, and the carbon dioxide content of the gaseous phase increases above the 0.00% baseline value found for runs No. 1 and 2. The carbon dioxide evolved in a continuous flow system is detected in the offgases and addition of alkalinity to the raw feed will maintain the oxidized effluent in the desired pH operating range.

The alkalinity added may be in the form of alkali metal hydroxides, such as sodium hydroxide or potassium hydroxide, or alkali metal carbonate or bicarbonate, such as sodium or potassium carbonate or bicarbonate. Alkaline earth metal hydroxides, such as magnesium or calcium hydroxide, may also be used but these forms of alkalinity are less preferred.

From the foregoing description, one skilled in the art can easily ascertain the essential characteristics of the invention and, without departing from the spirit and scope thereof, make various changes and modifications to adapt it to various usages.

I claim:

1. A process for preventing corrosion to the materials of construction of a nickel-based alloy or ferrous-based alloy wet oxidation system treating raw caustic wastewaters at elevated temperature and pressure comprising the steps;

(a) establishing a flow of caustic wastewater and oxygen containing gas through said wet oxidation system to produce an oxidized gas/liquid mixture;

(b) separating said oxidized gas/liquid mixture into an oxidized liquid phase effluent and a gaseous phase effluent;

(c) measuring the carbon dioxide content of said gaseous phase effluent to establish a baseline carbon dioxide content value while the pH of said system liquid effluent remains at 7 or above; and (d) adding sufficient alkalinity to said raw caustic wastewater to maintain said system liquid effluent pH at 7 or above, upon the carbon dioxide content of said gaseous phase effluent exceeding said baseline value by a selected proportion, thereby preventing excessive corrosion to the material of construction of said wet oxidation system.

2. A process according to claim 1 wherein said caustic wastewater is a sulfidic scrubbing liquor.

3. A process according to claim 1 wherein said materials of construction of said wet oxidation system is a nickel-based alloy and said elevated temperature is between about 105° C. and 300° C.

4. A process according to claim 1 wherein said materials of construction of said wet oxidation system is a nickel-based alloy and said elevated pressure is between about 45 psig and 4,000 psig.

5. A process according to claim 1 wherein said materials of construction of said wet oxidation system is a ferrous-based alloy and said elevated temperature is between about 105° C. and 175° C.

6. A process according to claim 1 wherein said materials of construction of said wet oxidation system is a ferrous-based alloy and said elevated pressure is between about 45 psig and 1,000 psig.

7. A process according to claim 1 wherein said oxygen containing gas is air.

8. A process for preventing corrosion to the materials of construction of a nickel-based alloy or ferrous-based alloy wet oxidation system treating raw caustic wastewaters at elevated temperature and pressure comprising the steps;

(a) establishing a flow of clean water and oxygen containing gas through said wet oxidation system;

(b) adding a caustic wastewater to said system at a point within a reactor vessel or at a point as far upstream of said reactor vessel as a process heat exchanger, to produce an oxidized gas/liquid mixture;

(c) separating said oxidized gas/liquid mixture into an oxidized liquid phase effluent and a gaseous phase effluent;

(d) measuring the carbon dioxide content of said gaseous phase effluent to establish a baseline carbon dioxide content value while the pH of said system liquid effluent remains at 7 or above; and (e) adding sufficient alkalinity to said raw caustic wastewater to maintain said system liquid effluent pH at 7 or above, upon the carbon dioxide content of said gaseous phase effluent exceeding said baseline value by a selected proportion, thereby preventing excessive corrosion to the material of construction of said wet oxidation system.

9. A process according to claim 8 wherein said caustic wastewater is a sulfidic scrubbing liquor.

10. A process according to claim 8 wherein said materials of construction of said wet oxidation system is a nickel-based alloy and said elevated temperature is between about 105° C. and 300° C.

11. A process according to claim 8 wherein said materials of construction of said wet oxidation system is a nickel-based alloy and said elevated pressure is between about 45 psig and 4,000 psig.

12. A process according to claim 8 wherein said materials of construction of said wet oxidation system is a ferrous-based alloy and said elevated temperature is between about 105° C. and 175° C.

13. A process according to claim 8 wherein said materials of construction of said wet oxidation system is a ferrous-based alloy and said elevated pressure is between about 45 psig and 1,000 psig.

14. A process according to claim 8 wherein said oxygen containing gas is air.

* * * * *

UNITED STATES PATENT AND TRADEMARK OFFICE
CERTIFICATE OF CORRECTION

PATENT NO. : 5,460,732
DATED : October 24, 1995
INVENTOR(S) : Joseph A. Momont

It is certified that error appears in the above-identified patent and that said Letters Patent is hereby corrected as shown below:

In TABLE 1, first line beginning pH = 5, under heading {$H^+$}, delete "$1 \times 10^{-4}$" and insert --$1 \times 10^{-5}$-- therefor.

In TABLE 1, second line beginning pH = 6, under heading {$H^+$}, delete "$1 \times 10^{-4}$" and insert --$1 \times 10^{-6}$-- therefor.

In TABLE 1, third line beginning pH = 7, under heading {$H^+$}, delete "$1 \times 10^{-4}$" and insert --$1 \times 10^{-7}$-- therefor.

In TABLE 1, fourth line beginning pH = 8, under heading {$H^+$}, delete "$1 \times 10^{-4}$" and insert --$1 \times 10^{-8}$-- therefor.

In TABLE 1, fifth line beginning pH = 9, under heading {$H^+$}, delete "$1 \times 10^{-4}$" and insert --$1 \times 10^{-9}$-- therefor.

Signed and Sealed this

Twenty-seventh Day of February, 1996

Attest:

BRUCE LEHMAN

*Attesting Officer*     *Commissioner of Patents and Trademarks*